(12) United States Patent
Bohner et al.

(10) Patent No.: US 6,213,246 B1
(45) Date of Patent: Apr. 10, 2001

(54) ELECTRICALLY ACTUATED VEHICLE STEERING SYSTEM

(75) Inventors: Hubert Bohner, Boeblingen; Martin Moser, Fellbach; Reinhold Schneckenburger, Rutesheim, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/231,675

(22) Filed: Jan. 15, 1999

(30) Foreign Application Priority Data

Jan. 16, 1998 (DE) ............................. 198 01 393

(51) Int. Cl.⁷ ...................................... B62D 5/08
(52) U.S. Cl. .............................. 180/403; 180/406
(58) Field of Search ........................... 180/402, 403, 180/405, 406, 407

(56) References Cited

U.S. PATENT DOCUMENTS

| | | | |
|---|---|---|---|
| 4,553,389 | * 11/1985 | Tischer et al. | 60/384 |
| 4,798,256 | * 1/1989 | Fassbender | 180/406 |
| 5,845,736 | * 12/1998 | Bohner et al. | 180/403 |
| 5,862,878 | * 1/1999 | Bohner et al. | 180/403 |
| 6,047,788 | * 4/2000 | Bohner et al. | 180/406 |

FOREIGN PATENT DOCUMENTS

| | | |
|---|---|---|
| 42 32 256 A1 | 9/1992 | (DE) . |
| 44 22 386 C1 | 6/1994 | (DE) . |
| 195 40 956 C1 | 11/1995 | (DE) . |
| 195 46 942 C1 | 12/1995 | (DE) . |
| 2259892 | 3/1993 | (GB) . |
| 2279304 | 4/1995 | (GB) . |
| 2 290 511 | 3/1996 | (GB) . |
| 2 320 003 | 6/1998 | (GB) . |
| 2321439 | 7/1998 | (GB) . |
| 61-291268 | 12/1986 | (JP) . |
| 8-11733 | 1/1996 | (JP) . |
| WO 97/39935 | 10/1997 | (WO) . |

OTHER PUBLICATIONS

Copy of Japanese Office Action dated Oct. 22, 1999, and English translation.

* cited by examiner

*Primary Examiner*—Kevin Hurley
(74) *Attorney, Agent, or Firm*—Evenson, McKeown, Edwards & Lenahan, P.L.L.C.

(57) ABSTRACT

In a steering system for a motor vehicle, the steered vehicle wheels, during normal operation, are coupled with a steering handle only through an electronic regulating system that constantly checks for correct function. The regulating system controls an actuator for the steering adjustment of the steered vehicle wheels in response to a signal from a set value transmitter which is actuated by the steering handle. During abnormal operation, a mechanical or hydraulic forced coupling is introduced between the steering handle and the steered vehicle wheels. At the same time the actuator and/or a manual force adjuster associated with the steering handle operate as a servo motor.

8 Claims, 2 Drawing Sheets

ELECTRICALLY ACTUATED VEHICLE STEERING SYSTEM

BACKGROUND AND SUMMARY OF THE INVENTION

This application claims the priority of German patent document 198 01 393.0, filed Jan. 1, 1998, the disclosure of which is expressly incorporated by reference herein.

The invention relates to a steering system of a motor vehicle whose steered vehicle wheels are coupled during normal operation, with a steering handle (for example a steering wheel) by an electronic regulating system that constantly checks for correct function, and regulates a steering actuator which is connected with and adjusts the steered vehicle wheels. For this purpose a steering angle setpoint generator is actuated by the steering handle, and a steering angle setpoint sensor is actuated by the steered vehicle wheels. The regulating system also regulates a manual force setting device connected with the steering handle to simulate a steering resistance. For this purposes, a manual force set value sensor detects the forces transmitted between the steering actuator and the steered vehicle wheels, as well as a manual force actual value sensor that detects forces transmitted between the manual force adjusting device and the steering handle.

During abnormal or emergency operation, the steered vehicle wheels are forcibly coupled, especially mechanically or hydraulically for adjusting the steering by the steering handle.

Steering systems have been developed for future motor vehicles that operate by the "steer by wire" concept, at least during normal operation. Such systems, which are described for example in German patents documents DE 42 32 256 A1, DE 195 40 956 C1, and DE 195 46 942 C1, offer the basic advantage that they are suitable without design modifications, for a wide variety of vehicles, at least in terms of the regulating system and associated sensing system. By appropriate programming, practically any translation ratio can be produced between the adjusting stroke of the steering handle and the change in the steering angle of the steered vehicle wheels. In addition, it is possible to connect the regulating system with additional sensors in order to automatically take into account or adjust for parameters to be set, for example side wind influences.

In order to ensure a satisfactory degree of safety in the event of system errors, provision can be made to automatically switch to an operating mode for abnormal operation or emergency operation if an error occurs in the regulating system or if the signals evaluated by the regulating system are absent. In this operating mode, forced coupling between the steering handle and the steered vehicle wheels can be provided so that this steering system theoretically operates like a conventional steering system, but the usual mechanical steering column found in conventional steering systems can be replaced by other mechanical systems or even by hydraulic, especially hydrostatic systems.

According to German patent document DE 195 40 956 C1 referred to above, a mechanical connection between the steering handle and the steered vehicle wheels is provided for emergency operation. For this purpose a clutch, which normally keeps this mechanical connection separated, is closed in an emergency to produce the mechanical forced coupling between the steering handle and the steered vehicle wheels. A servo valve that is inactive during normal operation is located in the mechanical connection between the steering wheel and the steered vehicle wheels, by which valve the hydraulic steering actuator provided for normal operation can be actuated as a conventional servo valve.

In German patent document DE 195 46 942 C1, a hydraulic rod between the steering handle and the steered vehicle wheels becomes effective in an emergency, so that a double-acting compressing element actuated by the steering handle is forcibly connected hydraulically with another compressing element coupled with the steered vehicle wheels.

In a conventional power steering disclosed in German DE 44 22 383 C1, the steering wheel is continuously forcibly connected mechanically with the steered vehicle wheels to adjust their steering. A servo valve system, which is actuated as a function of steering forces transmitted between the steering wheel and the steered vehicle wheels, controls a hydraulic servo motor so that the manual forces to be applied to the steering wheel for an individual steering maneuver are reduced to a greater or lesser degree. In addition, an electric motor that is free of self-locking, and can act on the steering wheel, is controlled as a function of the signals from a manual force sensor associated with the steering wheel and/or as a function of the steering forces acting on the steered vehicle wheels. In this manner, it is assured that the feedback forces which are perceptible in the steering wheel are comparable to the steering forces acting on the steered vehicle wheels. In addition, if the hydraulic servo system should fail, the electric motor can operate as an emergency servo motor.

The goal of the present invention is ensure greater safety for a steering system of the type recited at the outset.

These and other objects and advantages are achieved by the vehicle steering system according to the invention, in which upon forced coupling of the steering handle and the steered vehicle wheels, a manual force actual value sensor detects the steering forces transmitted between the steering handle and the steered vehicle wheels and controls the regulating system, with sufficient functional ability. A manual force adjusting device, and/or the steering actuator functions in the manner of a servo motor, to reduce the manual forces required for steering maneuvers.

For abnormal operation or emergency operation, a hydraulic forced coupling is provided between the steering handle and the steered vehicle wheels, and pressure sensors are mounted on a hydraulic system that produces the hydraulic force coupling, for detecting leaks. In this manner, during hydraulic forced coupling of the steering handle and the steered vehicle wheels signals can be derived from the signals of these sensors, which are correlated with forces transmitted between the steering handle and the steered vehicle wheels.

The present invention is based on the general idea of using a sensor associated with a steering handle, whose signals are correlated with the manual forces exerted on the steering handle, to determine the forces transmitted between the manual force adjusting device and the steering handle during normal operation and to determine the forces transmitted between the steering handle and the steered vehicle wheels during abnormal operation. In the former case the manual forces can be regulated by analogy with a steering resistance to be simulated, and in the latter case the manual forces required for steering actuation of the steered vehicle wheels can be reduced as in the case of a conventional power steering system. According to the invention, an especially high degree of safety is ensured because sensors that monitor the tightness of the hydraulic emergency system during normal operation, and thus are themselves constantly monitored for functional ability, are available for further tasks in emergency operation, namely detecting the steering forces acting on the steered vehicle wheels.

Thus, it is assured with a maximum degree of reliability that the emergency system can operate as a power steering system.

Other objects, advantages and novel features of the present invention will become apparent from the following detailed description of the invention when considered in conjunction with the accompanying drawings.

DETAILED DESCRIPTION OF THE DRAWINGS

Figure 1:
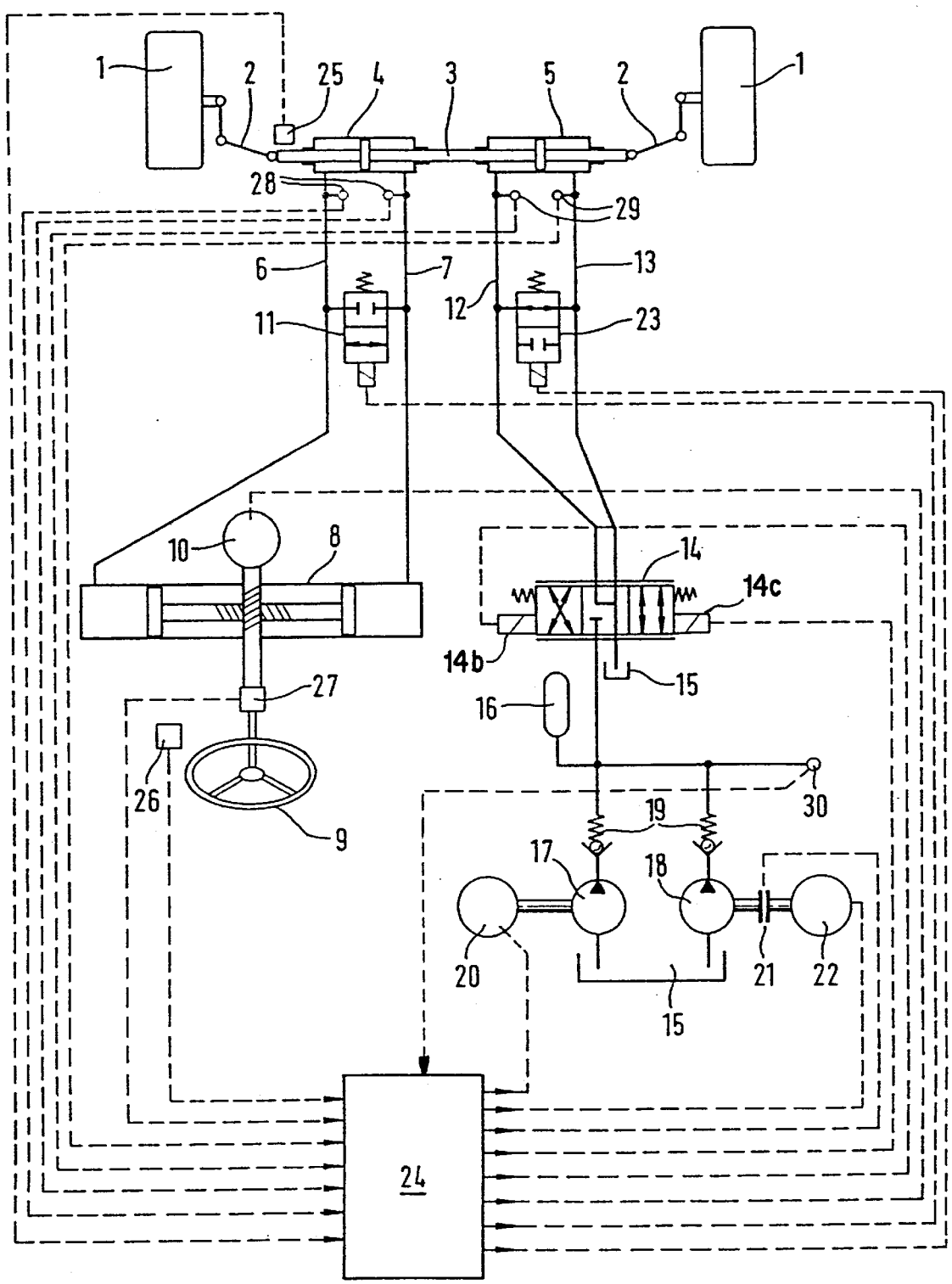
FIG. 1 shows a schematic diagram of a first embodiment.

In the example shown in FIG. 1, a motor vehicle (not shown in greater detail) has steerable front wheels 1 that are steerably coupled to each other by tie rods 2 and a rod 3. Rod 3 forms the piston rod of two parallel acting double acting piston-cylinder assemblies 4 and 5.

Piston-cylinder assembly 4 is coupled by hydraulic lines 6, 7 with the two piston working chambers of a double-acting piston-cylinder assembly 8, whose pistons are forcibly coupled mechanically with a steering wheel 7. The pistons of piston-cylinder assembly 8 shift to the right and left as steering wheel 9 is rotated clockwise or counterclockwise, and a displacement of the pistons of piston-cylinder assembly 8 results in a corresponding rotation of steering wheel 9.

Steering wheel 9 is also connected drivewise with a self-locking free electric motor 10 which, with the motor shaft secured, operates as a pure force generator, for the purpose explained below.

A shutoff valve 11 located between hydraulic lines 6 and 7 is switched against the force of a return spring from a closed position (shown) into an open position (not shown), by energization of its adjusting magnet. When the electric current powering the adjusting magnet is switched off, it is automatically returned by the restoring spring to the closed position (shown) or is held in this position.

Piston-cylinder assembly 5 is connected by hydraulic lines 12 and 13 with two connections of a control valve 14. The latter valve is connected by two additional connections with a relatively zero-pressure hydraulic reservoir 15 and a hydraulic pressure reservoir 16. Pressure reservoir 16 can be topped up by pumps 17 and 18, each of which is secured by a check valve 19 against any return from the pressure side to the suction side, and is connected on the suction side to reservoir 15A. Pump 17 is driven by an electric motor 20, while pump 18 can be connected by a switchable clutch 21 with engine 22 of the motor vehicle.

A shutoff valve 23 is located between hydraulic lines 12 and 13. By electrical energization of its adjusting magnet, the shutoff valve 23 can be moved against the force of a return spring from the open position (shown) into its closed position.

An electronic regulating and control system 24 has an input which is connected with a sensor 25 for detecting the actual value of the steering angle of front wheels 1. This sensor 25 can cooperate with rod 3 for example, which performs an adjusting stroke analogous to the steering angle during steering adjustment of wheels 1.

In addition, inputs to the control system 24 are also connected with a sensor 26 actuated by steering wheel 9 for the set value of the steering angle, and torque sensor 27 which determines the forces and/or torques transmitted between steering wheel 9 and piston-cylinder assembly 8 and/or electric motor 10.

Finally, a plurality of pressure sensors 28, 29 and 30 are connected as inputs to the regulating and control system 24, whose signals reproduce the hydraulic pressures in hydraulic lines 6, 7, 12 and 13 and the pressure of pressure reservoir 16 or at the pressure inlet of control valve 14.

On the output side, regulating and control system 24 is connected with the adjusting magnets of shutoff valves 11 and 23 as well as those of control valve 14. In addition, electric motors 10 and 20 as well as clutch 21 are controlled by the output of regulating and control system 24.

The steering system in FIG. 1 functions as follows:

During normal operation, switching valves 11 and 23 of regulating and control system 24 are moved into positions not shown in FIG. 1 (that is, valve 11 is open and valve 23 is closed), by energizing the adjusting magnets and are held in these positions. Accordingly, piston-cylinder assembly 5 is uncoupled hydraulically from piston-cylinder assembly 8 and steering wheel 9. On the other hand, the pressure difference between the two piston working chambers of piston-cylinder assembly 5 can be controlled by actuating control valve 14, as outlined below.

Regulating and control system 24 determines the actual value of the steering angle of front wheels 1 through sensor 25, and the set value of the steering angle through sensor 26 actuated by steering wheel 9. The adjusting magnets 14b, 14c of control valve 14 are then controlled on the basis of a comparison of the set value with the actual value performed by regulating and control system 24.

If there is no difference between the set value and the actual value, control valve 14 remains in the middle position (shown), in which piston-cylinder assembly 5 is hydraulically switched to freewheel and is connected with reservoir 15, while pressure reservoir 16 (which is constantly topped up by pumps 17 or 18 as much as necessary depending on the signal from pressure sensor 30) is cut off from piston-cylinder assembly 5.

If there is a difference between the set value and the actual value, control valve 14 is moved from the middle position shown to the right or left, depending on the direction of the difference between the set value and the actual value, so that in each case a working chamber of the piston of piston-cylinder assembly 5 is controllably connected with pressure reservoir 16 or the pressure supply formed in this case by pumps 17 and 18, and the other piston working chamber of assembly 5 is controllably connected with reservoir 15. In other words a controllable pressure difference acts on piston-cylinder assembly 5, causing it to produce an adjusting force in a direction that corresponds to the direction of the difference in the steering angle between the set value and actual value. In this manner, any difference between the set value and actual value of the steering angle is compensated in short order, and front wheels 1 follow the steering adjustment of steering wheel 9.

From the signals of pressure sensors 29, the regulating and steering system 24 can determine the pressure difference acting on piston-cylinder assembly 5, whose magnitude is correlated with the steering forces acting on front wheels 1. This pressure difference is treated as the set value for a manual force that can be felt in the steering wheel, which regulating and control system 24 sets by appropriate control of electric motor 10. For this purpose, the torque sensor 27 detects the moments acting between electric motor 10 and piston-cylinder assembly 8 and steering wheel 9 and hence the actual value of the manual force.

As a result, therefore, motor 10 is regulated as a function of a comparison of the set value and actual value for the manual forces. In this manner, the driver obtains from the steering wheel a haptic feedback of the steering and disturbing forces actually acting on vehicle steered wheels 1 of the vehicle.

Regulating and control system 24 constantly monitors correct functioning of the system. In addition, the signals from transducers and sensors 25 to 30 that are connected with the input side of regulating and control system 24 are checked constantly for plausibility.

If a system error is found, at least the adjusting magnet of shutoff valve 11 is switched off, so that shutoff valve 11 assumes the closed position shown in FIG. 1. Thus, piston-cylinder assemblies 4 and 8 and hence steerable front wheels 1 and steering wheel 9, are forcibly coupled with one another hydraulically.

If an error appears in the hydraulic system of piston-cylinder assembly 5 or appears to be possible, the adjusting magnet of shutoff valve 23 is also disconnected electrically so that this valve 23 assumes the open position shown in FIG. 1 and piston-cylinder assembly 5 is switched to free-wheel under all circumstances.

It will be assumed in the following that only limited system errors have occurred, for example the signals from pressure sensors 29 may be defective or have failed completely or partially. This means that the actual value of the steering forces at front wheels 1 that is normally obtained from the signals from these pressure sensors 29 is no longer available, so that the manual force that can be felt at steering wheel 9 cannot be regulated any longer as a function of the actual value. If, as mentioned above, a hydraulic forced coupling between steering wheel 9 and steered front wheels 1 is produced by shutting off the current to the adjusting magnets of shutoff valve 11, servo support for the steering maneuver initiated by the driver can be guaranteed additionally in the manner described below.

Torque sensor 27 determines the forces and moments transmitted between steering wheel 9 and steered wheels 1. Depending on these forces or moments, regulating and control system 24 can actuate electric motor 10 and/or control valve 14 in such fashion that electric motor 10 and/or piston-cylinder assembly 5 produces a positioning or servo force by which the manual force required for the respective steering maneuver and to be applied to steering wheel 9 is reduced.

If torque sensor 27 is likewise no longer available, the forces and moments transmitted between steering wheel 9 and steered wheels 1 can also be derived from the signals of pressure sensors 28, which normally serve only for checking the tightness of lines 6 and 7 as well as the piston-cylinder assemblies 4 and 8 connected thereto. If sensor 27 fails, self-locking electric motor 10 will be disconnected and control valve 14 will be actuated as a function of the signals from pressure sensors 28 in such fashion that piston-cylinder assembly 5 produces a positioning or servo force that reduces the pressure difference at pressure sensors 28.

Figure 2:
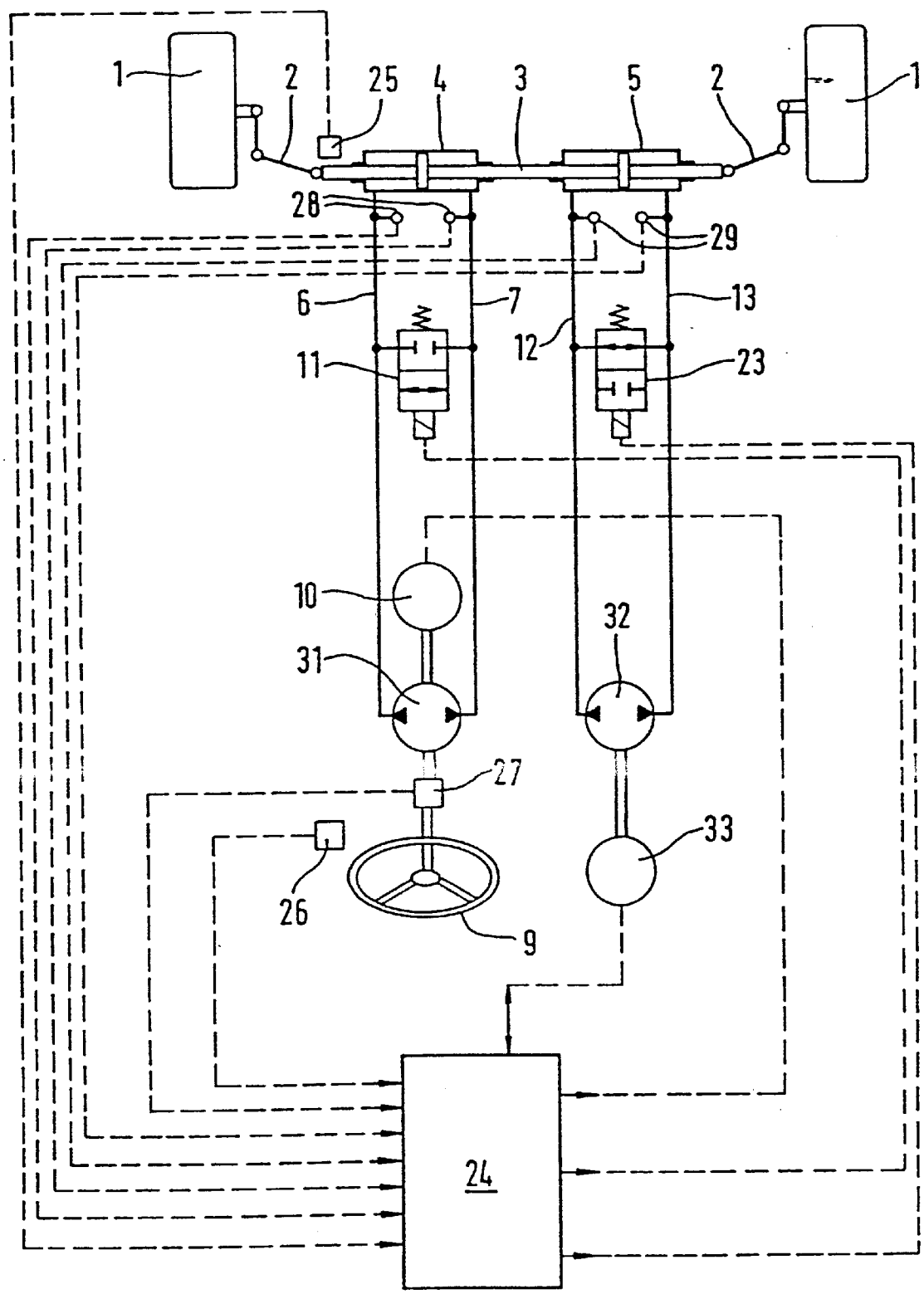
FIG. 2 shows a corresponding view of a second embodiment of the invention.

The embodiment shown in FIG. 2 differs from the system according to FIG. 1 mainly in that piston-cylinder assembly 8 is replaced by a hydrostatic reversible pump 31 with which hydraulic media can be exchanged between hydraulic lines 6 and 7. This pump 31 is forcibly coupled drivewise on the one hand with electric motor 10, and on the other hand with steering wheel 9.

In addition, another reversible and preferably likewise hydrostatic pump 32 can connect hydraulic lines 12 and 13. To drive this pump 32, an electric motor 33 is used that is actuated by regulating and control system 24.

The function of the embodiment shown in FIG. 2 largely corresponds to the function of the embodiment according to FIG. 1.

When switching valve 11 assumes its closed position, a hydrostatic pump 31 and piston-cylinder assembly 4, and hence steerable vehicle wheels 1 and steering wheel 9, are forcibly coupled with one another.

When electric motor 33 runs in one direction or the other or produces a force in one direction or the other, a greater or lesser adjusting force is produced in one direction or the other by pump 32, which is driven by the motor, with shutoff valve 23 closed on piston-cylinder assembly 5. As a result, during normal operation, a steering adjustment of the steered vehicle wheels can be performed that corresponds to the instructions from steering angle set value sensor 26. In an emergency operating mode, depending on the signals from torque sensor 27 or pressure sensors 28, a servo force can be produced.

One advantage of the embodiment according to FIG. 2 is that the electric current applied to electric motor 33 (in conjunction with the electrical voltage applied to electric motor 33) is similar to the load on electric motor 33, and hence is also analogous to the adjusting force produced by piston-cylinder assembly 5. Thus, the pressure difference between lines 12 and 13 can be detected by pressure sensors 29 and is analogous to the adjusting force of piston-cylinder assembly 5. It can also be determined by acquisition of electrical parameters, in this case the electrical voltage or current strength at or between the terminals of electric motor 33. These electrical parameters therefore constitute a redundant signal with respect to the signals from pressure sensors 29. In FIG. 2, a double arrow in the connection (drawn with dashed lines) between electric motor 33 and control and regulating system 24 indicates that control or regulating system 24 controls these parameters and also evaluates them as an input signal. If pressure sensors 29 should fail, their signals for determining the pressure difference between lines 12 and 13 can be replaced by an evaluation of the electrical parameters of electric motor 33. The existing signals from pressure sensors 29 can thus be checked for plausibility.

In all of the embodiments, measures are provided (not described in greater detail) for monitoring the tightness of the hydraulic system and for initiating emergency measures if necessary.

By contrast to the view in FIG. 1, control valve 14 can also have a so-called "open middle," in all the connections of valve 14 communicate with one another. The connection that leads to reservoir 15 is thus connected with all the other valve connections and therefore also with the pressure supply formed by pumps 17 and 18. As soon as valve 14 assumes the middle position, pumps 17 and 18 supply valve 14 and reservoir 15 at relatively zero pressure. With such an arrangement, pressure reservoir 16 can be eliminated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steering system for a motor vehicle having steered vehicle wheels that are coupled to a steering handle during normal operation by an electronic regulating system that constantly checks for correct function, said regulating system being connected with a steering angle setpoint generator actuated by the steering handle and with a steering angle setpoint sensor actuated by the steered vehicle wheels for regulating a steering actuator for adjusting the steered vehicle wheels, and being further connected with at least one first sensor which generates signals indicative of forces transmitted between the steering actuator and the steered vehicle wheels, as well as a manual force actual value sensor that detects forces transmitted between a manual force adjusting device and the steering handle, regulating a manual force setting device connected with steering handle to simulate a steering resistance wherein:

said steered vehicle wheels are forcibly coupled with the steering handle during abnormal or emergency operation, for adjusting steering via the steering handle;

during forcible coupling of steering handle and steered vehicle wheels, the manual force actual value sensor detects steering forces transmitted between the steering handle and the steered vehicle wheels;

the regulating system controls one of the manual force adjuster and the steering actuator in the manner of a servo motor to reduce manual forces required during steering maneuvers, with hydraulic forced coupling being provided for abnormal operation or emergency operation between steering handle and steered vehicle wheels;

second sensors are mounted on a hydraulic system that produces hydraulic force coupling for generating signals indicative of leaks in the hydraulic system; and said regulating system includes apparatus for analyzing signals of the second sensors during hydraulic forced coupling of steering handle and steered vehicle wheels, to determine forces transmitted between steering handle and steered vehicle wheels.

2. The steering system according to claim 1, wherein during forcible coupling of the steering handle and steered vehicle wheels, an electronic subsystem of the regulating system acts as a servo motor to actuate one of the manual force adjuster and the steering actuator.

3. The steering system according to claim 1, wherein the steering actuator comprises a servo motor, which is operable as a function of the signals from pressure sensors.

4. The steering system according to claim 1, wherein:

an electric motor is provided as a steering actuator;

said electric motor cooperates as a manual force setpoint transmitter with the regulating system, which obtains electrical operating parameters from electric motor which are correlated to the forces transmitted between the steering actuator and steered vehicle wheels.

5. A steering system for a vehicle having steered vehicle wheels, comprising:

a steering input device for receiving a driver command for steering said vehicle wheels;

a first selectively operative manually driven coupling between said steering input device and said steered vehicle wheels, for adjusting a steering angle thereof, a second selectively operative coupling between said steering device and said steered vehicle wheels for adjusting a steering angle thereof, which second selectively actuatable coupling is selectively operable in parallel with said first selectively operative coupling;

at least one first sensor for continuously monitoring proper functioning of said second selectively operative coupling; and a regulating system for controlling said first and second selectively operative couplings; wherein said regulating system causes said first selectively operative coupling to be inoperative during normal functioning of said second selectively operative coupling; and during a detected abnormal functioning of said second selectively operative coupling, said regulating system causes said first selectively operative coupling to become operative, and causes said second selectively operative coupling either to become inoperative or to operate to provide a power assist to said first selectively operative coupling, depending on a nature of said abnormal functioning;

wherein said second selectively operable coupling includes:

a power assist unit coupled to assist manual driving of said first selectively operative coupling; and at least one second sensor for detecting a steering force exerted on said steered vehicle wheels;

at least one third sensor for detecting a force transmitted between said steering input device and said steered wheels; wherein during normal functioning of said second selectively operative coupling, said regulating system causes said power assist unit to exert a force on said steering input device as a function of signals from said at least one second sensor and said at least one third sensor, during a detected abnormal functioning of said second selectively operative coupling, said regulating system actuates said power assist unit to assist forces exerted on steering input device as a function of signals from said at least one third sensor.

6. The steering system according to claim 5, wherein said second selectively operative coupling is actuated by one of hydraulic, pneumatic and hydrostatic pressure; and said at least one first sensor comprises at least one sensor for determining pressure generated in said second selectively operative coupling.

7. The steering system according to claim 5, wherein said second selectively operative coupling is actuated by one of hydraulic, pneumatic and hydrostatic pressure; and said at least one first sensor comprises at least one sensor for determining pressure generated in said second selectively operative coupling.

8. The steering system according to claim 7 wherein said at least one second sensor comprises said at least one first sensor.

* * * * *